United States Patent
Ali et al.

(10) Patent No.: US 10,397,299 B2
(45) Date of Patent: *Aug. 27, 2019

(54) ADAPTIVE MULTI-CONTROL UNIT LOAD BALANCING IN A VOICE-OVER-IP SYSTEM

(71) Applicant: International Business Machines Corporation, Armonk, NY (US)

(72) Inventors: Diaa Eldin Ali Mohamed Mahmoud Ali, Doha (QA); Hitham Ahmed Assem Aly Salama, Dublin (IE); Christian B. Kau, Mountain View, CA (US); Patrick J. O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,576

(22) Filed: Jul. 6, 2018

(65) Prior Publication Data
US 2018/0316742 A1 Nov. 1, 2018

Related U.S. Application Data

(63) Continuation of application No. 15/211,371, filed on Jul. 15, 2016, now Pat. No. 10,212,206.

(51) Int. Cl.
*G06F 15/173* (2006.01)
*H04L 29/06* (2006.01)
*H04L 29/08* (2006.01)

(52) U.S. Cl.
CPC .......... *H04L 65/80* (2013.01); *H04L 65/1053* (2013.01); *H04L 65/1069* (2013.01);
(Continued)

(58) Field of Classification Search
CPC . H04L 65/80; H04L 65/1053; H04L 65/1069; H04L 65/4038; H04L 65/1004; H04L 65/14
(Continued)

(56) References Cited

U.S. PATENT DOCUMENTS

| | | |
|---|---|---|
| 7,043,006 B1 | 5/2006 | Chambers et al. |
| 7,940,684 B2 | 5/2011 | Boyes et al. |

(Continued)

FOREIGN PATENT DOCUMENTS

| | | |
|---|---|---|
| WO | 2001035655 A2 | 5/2001 |
| WO | 2010111867 A1 | 10/2010 |

OTHER PUBLICATIONS

Anonymous, "Method for Local MCU determination in a distributed Audio/Video conferencing system", Ip.com Prior Art Database Technical Disclosure. IP.com No. IPCOM000223265D. Nov. 15, 2012. 9 pages.

(Continued)

*Primary Examiner* — Liang Che A Wang
(74) *Attorney, Agent, or Firm* — Nathan M. Rau

(57) ABSTRACT

A Voice-over-IP (VOIP) system includes a plurality of multi control units (MCUs), in which a first MCU hosts a VOIP session. A method for recommending an MCU to host the VOIP session includes receiving MCU status associated with performance of each of the first MCU and a second MCU included in the VOIP system. The method further includes determining, based on the first and the second MCU status, that hosting the VOIP session on the second MCU can improve a VOIP system metric. According to the method, a recommendation is communicated to transfer hosting the VOIP session to the second MCU.

7 Claims, 5 Drawing Sheets

(52) U.S. Cl.
CPC ...... *H04L 65/4038* (2013.01); *H04L 67/1004* (2013.01); *H04L 67/14* (2013.01)

(58) Field of Classification Search
USPC ............... 709/204, 218, 223, 224, 226, 227
See application file for complete search history.

(56) References Cited

U.S. PATENT DOCUMENTS

| | | |
|---|---|---|
| 8,228,360 B2 | 7/2012 | Hamilton |
| 2002/0026515 A1 | 2/2002 | Michielsens et al. |
| 2002/0188731 A1 | 12/2002 | Potekhin et al. |
| 2008/0117838 A1 | 5/2008 | Yee et al. |
| 2013/0329595 A1 | 12/2013 | Scholz |
| 2014/0267571 A1 | 9/2014 | Periyannan et al. |
| 2014/0280595 A1 | 9/2014 | Mani et al. |
| 2015/0281025 A1 | 10/2015 | Wallbaum et al. |
| 2016/0080225 A1 | 3/2016 | Yadav et al. |
| 2017/0272512 A1 | 9/2017 | Pai et al. |
| 2018/0019887 A1 | 1/2018 | Ali et al. |
| 2018/0020037 A1 | 1/2018 | Ali et al. |

OTHER PUBLICATIONS

Leaver, "Multipoint Control Unit (MCU) Region Mapping", Ip.com Prior Art Database Technical Disclosure. IP.com No. IPCOM00022634D. Mar. 28, 2013. 6 pages.

IBM, List of IBM Patents or Patent Applications Treated as Related, Jul. 6, 2018, 2 pages.

| MCU STATE 210 | | |
|---|---|---|
| ID | USERS | IMPACT |
| 21A | 4 | 3% |
| 21B | 5 | 7% |
| 21C | 3 | 30% |
| 22D | 6 | 60% |
| SCORE | | 4.5/5 |

| MCU STATE 220 | | |
|---|---|---|
| ID | USERS | IMPACT |
| 22A | 4 | 2% |
| 22B | 5 | 10% |
| 22E | 2 | 5% |
| SCORE | | 4/5 |

| MCU STATE 230 | | |
|---|---|---|
| ID | USERS | IMPACT |
| 23A | 6 | 20% |
| 23B | 4 | 10% |
| 22C | 10 | 70% |
| SCORE | | 4.3/5 |

ADAPTIVE MULTI-CONTROL UNIT LOAD BALANCING IN A VOICE-OVER-IP SYSTEM

BACKGROUND

The present disclosure relates to Voice-over-IP (VOIP) systems, and more specifically, to balancing workloads of multi-control units (MCUs) associated with VOIP conferences hosted by the MCUs.

VOIP has become an important application class, with VOIP client applications being widely used by businesses and individuals. The reliability and reduced costs of basic two-party VOIP communications has encouraged the emergence of multi-party VOIP conferencing facilities. However, Voice-over-IP (VOIP) performance depends on a number of network-related factors, including available bandwidth, end to-end delay, packet loss and jitter. Variance in these parameters can degrade VOIP system performance and the Quality-of-Experience (QoE) perceived by conference participants. Additional, application specific factors—such as choice of codec, codec parameters, and jitter buffer sizing—can also impact QoE.

Correspondingly, it is more difficult to manage VOIP system and/or MCU performance and to ensure acceptable MCU performance and/or QoE in multi-party VOIP sessions. At the same time, it is important for implementers of VOIP applications to ensure acceptable QoE of VOIP sessions and take mitigating actions when QoE or other VOIP system metrics degrade to unacceptable levels.

VOIP conferencing systems can have multiple MCU nodes available and can include a "load balancer" that is responsible for distributing the participants among several MCUs based on the current load on the different MCUs. Load balancing can include solutions that automatically select an MCU for a VOIP session, suggest an MCU for a VOIP session and leave final selection to the participants, or simply allow participants in a VOIP session to manually select an MCU. However, such solutions lack a capability to dynamically detect degradation of VOIP system metrics (such as MCU performance or VOIP session QoE) and dynamically transfer a VOIP from a hosting MCU to an alternate MCU that can improve those VOIP system metrics.

SUMMARY

According to embodiments of the present disclosure, a multi control unit (MCU) in a Voice-over-IP (VOIP) system hosts a VOIP session. The VOIP session is associated with MCU status associated with performance of the first MCU. In embodiments of the present disclosure, a processor can perform a method to determine an alternate MCU to host the VOIP session.

According to the method, the processor receives the first MCU status and receives second MCU status for a second MCU included in the VOIP system. The second MCU status is associated with performance of the second MCU. Based on the first and second MCU status the processor determines that the second MCU hosting the VOIP session can improve a VOIP system metric and communicates a recommendation to transfer hosting the VOIP session to the second MCU.

In some embodiments, the processor determines a first health score based on the first MCU status and a second health score based on the second MCU status. The processor determines that the second MCU hosting the VOIP session can improve the VOIP system metric based on comparing the first health score with the second health score.

In embodiments the VOIP system metric comprise a performance metric associated with the first MCU. Also, in embodiments, the VOIP system metric comprises a quality-of-experience (QoE) metric associated with the VOIP session. In some of such embodiments the QoE metric is associated with a health score for the first MCU.

Embodiments of the present disclosure can include a VOIP system comprising a plurality of MCUs, conference devices connected to the MCUs, and an adaptive MCU load balancer (AMLB) including a processor. The AMLB processor is configured to receive MCU status from the MCUs, to determine based on the MCU status from the MCUs that an alternate MCU can host one or more VOIP sessions hosted on a first MCU, and to output a recommendation to transfer hosting one or more of the VOIP sessions hosted on the first MCU to the alternate MCU.

Other embodiments can include a computer programming product that includes processor instructions to cause a processor to perform methods of the present disclosure.

The method of the disclosure provides an advantage, in embodiments, of enabling a VOIP system to improve a VOIP system metric (e.g., MCU performance or Quality of Experience of a VOIP session) by determining an alternate MCU to host a VOIP session. A health score is advantageous as a simple metric to assess MCU performance and to select an alternate MCU. In embodiments, a QoE metric as an advantageous metric for determining that transferring a VOIP session to an alternate MCU can improve a VOIP system metric. An AMLB is advantageous to monitor MCU status and to determine that transferring a VOIP session to an alternate MCU can improve a VOIP system metric.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
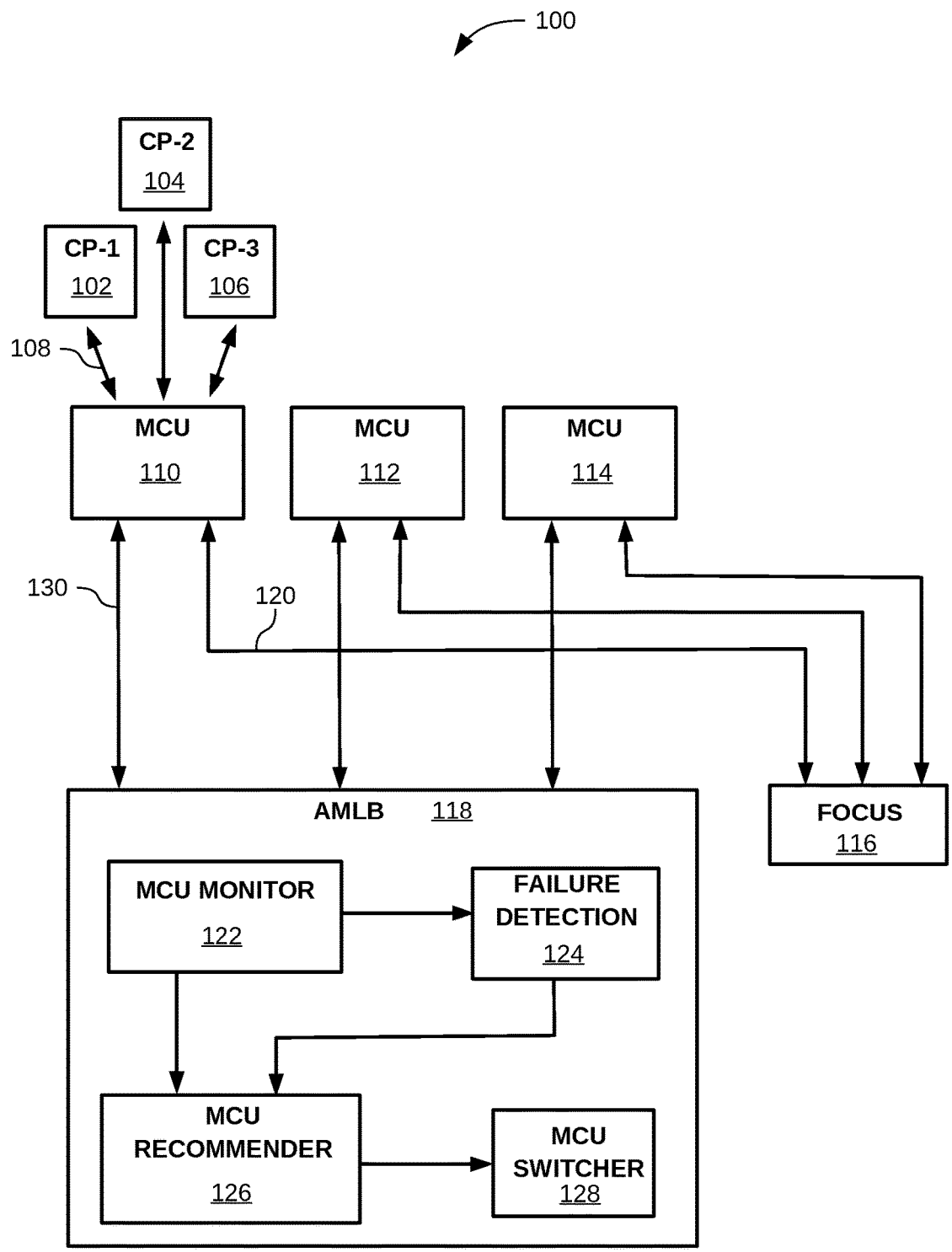
FIG. 1 is a block diagram illustrating a Voice-over-IP (VOIP) system, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to Voice-over-IP (VOIP) systems. More particular aspects relate to managing Quality-of-Experience (QoE) of VOIP sessions. While the present disclosure is not necessarily limited to such applications, various aspects of the disclosure may be appreciated through a discussion of various examples using this context.

Voice-over-IP (VOIP) systems enable participants (generally humans, but not necessarily limited to humans) in multi-way conference or "VOIP session", to communicate using computers, or other computing devices, connected to an internet. VOIP performance over an internet can depend on a variety of network (or, internet) factors, such as available bandwidth, end-end delays or response times, IP (Internet Protocol) packet loss and/or transmission jitter. Factors specific to applications used in a VOIP session, or used to host (e.g., by a computer or other electronic device capable of VOIP functions) a session can also affect VOIP performance, such as a codec, or set of codec parameters, used to encode or decode voice or media transmissions, transmission or reception buffer resources or sizes that can create performance jitter. A measure of performance of a VOIP system is "Quality of Service (QoS)", which can encompass various systemic metrics of a VOIP system, such as data packet loss, performance jitter, packet transmission or response times (e.g., packet latency), packet routing (which can cause packets to arrive out of sequence and produce incoherent or confused voice or media reproduction at a receiving end).

QoS of a VOIP system can be associated with a VOIP session "Quality of Experience (QoE)"; that is, the quality of a VOIP session as perceived by participants in the session. QoE can be a means to measure or reflect underlying systemic QoS. QoE can itself be measured quantitatively by a metric such as "Mean Opinion Score (MOS)". MOS can be measured, or predicted based on system design characteristics, in a telephony system (e.g., a VOIP system) and can be then related to QoE (e.g., using the ITU-T PESQ P8.62 standard) of one or more participants.

Variance in systemic factors can degrade QoS of a VOIP system, which in turn can lead to disruptions in a VOIP session utilizing the system. For example, a VOIP session may experience increased end-end response times, leading to a participant perceiving periods of silence, or broken or fragmented sounding, discussion with other participants. In another example, a VOIP session can include digital media (e.g., slide or video images in a presentation of a conference call) and variance in the QoS can lead to delays in video transmission, poor media reproduction at recipients' connections to the session, and so forth.

Such QoS degradation—and any associated disruption of voice or media reproduction experienced by a recipient—can lead, then, to reduced QoE as viewed by participants in VOIP sessions or using VOIP systems. Consequently, it can be important, in a VOIP system, to monitor and manage performance of VOIP sessions to maintain a particular minimum QoE metric for participants in those VOIP sessions.

A VOIP system can include a component, or set of components, that interconnect participants and/or provide resources to "host" a VOIP session between a particular group of participants. Monitoring hosting components of a VOIP session (e.g., monitoring QoS, QoE, or systemic metrics of a VOIP system that are associated with these) can detect degradation in QoE associated with the hosting components. In some cases, QoE of a VOIP session can be improved by transferring a VOIP session, or a portion thereof, from a hosting component that is experiencing reduced, or degraded, QoS or QoE, to other components of the system that can host the session with improved QoE (e.g., components that have unused or available capacity sufficient to substitute for those components experiencing the degradation).

It will be appreciated through the ensuing examples and figures of the disclosure, that the methods and system of the disclosure provide advantages over the known art, such as enabling a VOIP system to determine that hosting one or more VOIP sessions on an alternate MCU can improve one or more VOIP system metrics and to recommend a particular alternate MCU to host a particular VOIP session. In particular, monitoring MCU status and detecting a degradation of a VOIP system metric (e.g., MCU performance or VOIP session QoE), comparing status of MCUs comprising the VOIP system, and recommending an alternate MCU are advantageous over conventional solutions that do not facilitate dynamically transferring VOIP sessions in response to degradation of VOIP system metrics. It will be further appreciated that using an adaptive MCU load balancer to monitor MCU status and recommend an alternate MCU has the advantage of enabling embodiments of the disclosure to be included in components of the VOIP system or, alternatively, to be, or be included in, a stand-alone component (e.g., a computer) in communication with the VOIP system. It will also be appreciated that using a health score to make that determination has the advantage of a simple means to represent MCU operational states (e.g., MCU performance or QoE of one or more VOIP sessions).

FIG. 1 illustrates an example VOIP system, which includes components of a VOIP system that can detect degradation in some components hosting and recommend alternative components to host the session. VOIP system 100 includes Multi Control Units (MCUs) 110, 112, and 114; focus 116, and "Adaptive MCU Load Balancer (AMLB)" 118. In a VOIP system, an MCU can initiate and/or host a VOIP session. An MCU can initiate a VOIP session between conference participants by signaling between all of the participants using, for example, a "session initiation protocol" to establish connections between the participants within the session. An MCU can interact with a "focus", which can receive transmissions (e.g., a voice signal, or digital media transmission) from a participant, digitally decode transmissions, mix transmissions from multiple participants, and/or re-encode (digitally) and transmit these to other participants.

With reference to the example VOIP system of FIG. 1, MCU 110 can initiate and host a VOIP session (not shown). MCU 110 can establish a connection (e.g., 108) with conference participants, such as 102, 104, and 106 to initiate a VOIP session. A conference participant can be a conference device used (e.g., by a human user) to connect to one or more MCUs to participate in a conference. A conference device can be a mobile device (e.g. mobile phone or tablet computer), a computer, a virtual computer, or any of a variety of other electronic devices capable of connecting to a network (e.g., the Internet) and interacting with an MCU to participate in a VOIP session. A conference device (e.g., 102) can connect to an MCU (e.g., 110), for example, by means of a connection (not shown in FIG. 1) to a focus (e.g., 116) connected to the MCU. As used herein, "conference participant", or simply "participant" refers to a particular conferencing device(s) used to connect to a VOIP session or conference.

MCU 110 can host the session by receiving a transmission (e.g., a digitalized voice and/or media signal) from a participant (e.g., 102) and forwarding the transmission, or a processed derivation of that transmission, to other participants (e.g., 104 and/or 106) in the session. For example, MCU 110 can use connection 120 to focus 116 to forward the transmission to focus 116 for processing. Processing the transmission can include, for example, decoding the transmission signal, mixing the decoded signal with decoded signals of other transmissions (e.g., received from other MCUs), and re-encoding the decoded or mixed signals for transmission to the MCUs. Focus 116 can be embodied, for example, as an electronic or computing device with an input interface to receive the transmission, a processor to process the transmission (e.g., decode, mix, and/or re-encode), and an output interface to transmit the processed transmission to MCU 110 (e.g., using connection 120). MCU 110 can then forward that processed transmission to participants 104 and 106.

An MCU can communicate with an AMLB and an AMLB can monitor operations, or performance, of the MCU and/or VOIP sessions hosted by the MCU. An AMLB can, for example, monitor systemic metrics of an MCU, or can monitor QoE by measures such as MOS. An AMLB can monitor an MCU for operational failures (e.g., failures or performance degradation, of a hardware component involved in receiving or transmitting digital signals to or from an MCU or a focus). For example, AMLB 118 includes MCU monitor function 122 and failure detection function 124. MCU monitor function 122 can monitor QoE or other metrics of MCU 110, and failure detection function 124 can monitor operational status of MCU 110 to detect component failures or component performance degradation of MCU 110.

An AMLB can monitor multiple MCUs comprising a VOIP system and can determine, for example, that one or more MCUs are experiencing QoS degradation that may adversely affect (or, reduce) QoE of one or VOIP sessions hosted by the MCU(s). An AMLB can determine that other MCUs have capacity to host one or more VOIP sessions so as to improve, for example, QoE of the session(s). For example, MCU monitor function 122 can monitor metrics (e.g., MOS of conference participants) associated with MCUs 110 and 112. Based on the monitored metrics, monitor function 122 can determine that a VOIP session hosted by MCU 110 may be experiencing reduced QoE (e.g., by identifying a trend towards one or more participants having a lower MOS). Based on the monitored metrics, monitor function 122 can determine that MCU 112 has capacity available (e.g., overall bandwidth) to host one or more VOIP sessions currently hosted by MCU 110 and potentially experiencing lower QoE.

Based on monitored metrics, an AMLB can determine that an alternate MCU can host a VOIP session experiencing (or, potentially experiencing) reduced or degraded QoE and can recommend transferring a VOIP session from a degraded MCU to that alternate MCU. For example, monitor function 122 can determine that a VOIP session hosted on MCU 110 is potentially experiencing reduced QoE (e.g., because MCU 110 participants are consuming more bandwidth than available on MCU 110). Monitor function 122 can further determine that MCU 112 has capacity to host more VOIP sessions, or participants, than it presently hosts and that the available capacity is sufficient to host one or more VOIP sessions hosted on MCU 110. Accordingly, online recommender function 126 can recommend transferring one or more VOIP sessions from MCU 110 to MCU 112.

In some embodiments, an AMLB (or, another component of the VOIP system) can operate to switch a VOIP session (e.g., transfer connections to the VOIP conference participants) from the currently hosting MCU to the alternate MCU. For example, MCU switcher function 128 in AMLB 118 can receive a recommendation from online recommender 126 to switch a VOIP session from MCU 110 to MCU 112. In response, MCU switcher function 128 can initiate, coordinate, and/or perform transferring the participants in the VOIP session hosted by MCU 110 to a new VOIP session (including the same, or possibly a subset of, participants as hosted by MCU 110) hosted by MCU 112.

The example VOIP system of FIG. 1 is not intended to limit embodiments. For example, MCUs can be or can incorporated into, individual computers or computing devices, or can be combined into a single computer, computing device, or other electronic device (e.g., a special purpose device specific to MCU functions). Similarly, a focus can be an individual component of a VOIP system or can be combined with other components of the system. Embodiments of an AMLB can be a component of an MCU or a focus, can be distributed amongst all or a subset of the MCUs (e.g., operating as a distributed component of a VOIP system), or can be embodied in whole or in part in another computer (or, computing device or system) in communication with a VOIP system or one or more MCUs, or can be any combination of the foregoing.

Functions and/or components of an AMLB—such as 122, 124, 126, and 128 illustrated in FIG. 1—can be implemented in a variety of manners and/or combinations. For example, MCU monitor 122, MCU recommender 126, failure detection 124, and MCU switcher 128 can be combined into a single component (e.g., a program or hardware element) of AMLB 118, or subsets of these components can be combined into fewer components than illustrated. Functions of an AMLB can be distributed among other components of a VOIP system to form a distributed AMLB. For example, MCU monitor function 122 can be a component of one or more of MCUs 110, 112, and 114. In an embodiment, each of MCUs 110, 112, and 114 can include an MCU monitor function like MCU monitor 122. In alternative embodiments, one or a subset of MCUs 110, 112, and 114 can include an MCU monitor function like MCU monitor 122, and the MCU monitor function(s) can receive MCU status from other MCUs and can aggregate that status with status of an MCU in which the MCU monitor function is included, or with status from other MCUs or other MCU monitor functions. MCU switcher function 128 can be included in, for example, an AMLB, in an MCU, or in a computer in communication with the AMLB or another component of the VOIP system.

It would be apparent to one of ordinary skill in the art that the components of VOIP system 100, or of AMLB 118, in FIG. 1 can be embodied in a variety of computers, computing devices, or other special-purpose devices and can be embodied as software, firmware, hardware, or any of a variety of combinations of the foregoing, or combinations of monitoring and/or management functions included in a VOIP system.

Figures 2, 3A, 3B:
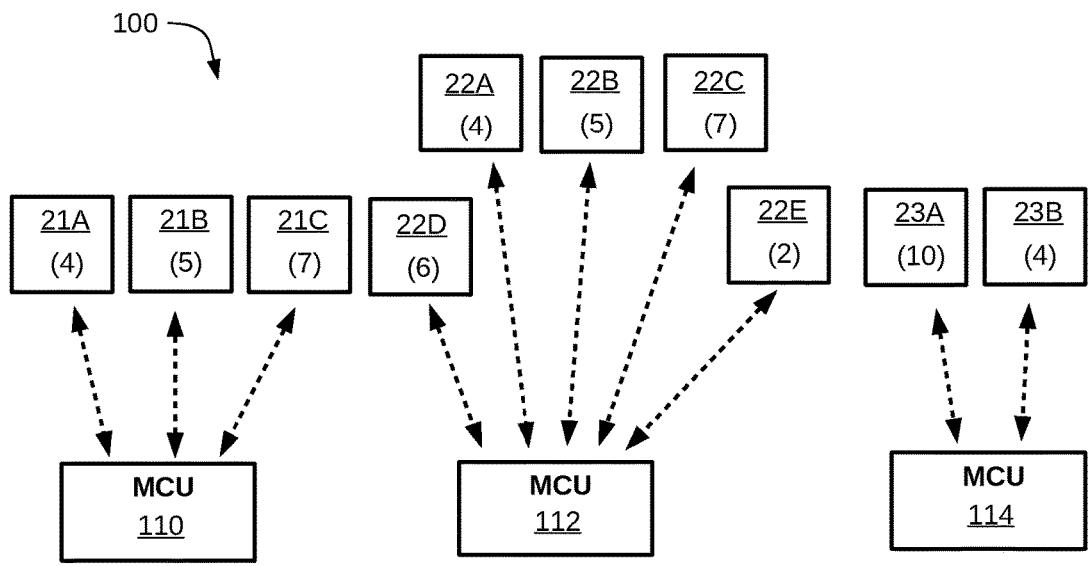
FIG. 2 is a block diagram illustrating an example of multi control units (MCUs) in a VOIP system hosting a plurality of VOIP sessions, according to aspects of the disclosure.
FIG. 3A illustrates an example of health scores for the example of FIG. 2, according to aspects of the disclosure.
FIG. 3B illustrates a second example of health scores for the example of FIG. 2, according to aspects of the disclosure.

FIG. 2 illustrates example VOIP sessions established with the various MCUs 110, 112, and 114 of the example VOIP system of FIG. 1. To simplify the example of FIG. 2, AMLB 118 and focus 116 from FIG. 1 are omitted, but understood, in the context of VOIP system 100 of FIG. 1, to be included in system 100 as illustrated in FIG. 2.

In FIG. 2, MCU 110 hosts VOIP sessions 21A-21C (collectively, VOIP sessions 21), MCU 112 hosts VOIP sessions 22A-22E (collectively, VOIP sessions 22), and MCU 114 hosts VOIP sessions 23A and 23B (collectively, VOIP sessions 23). The parenthetical numbers shown for each session in FIG. 2 indicate the number of conference participants in each of the respective sessions. For example, session 21A includes 4 participants, 21B includes 5, and so forth. It is to be understood that the number of participants in each session as well as the number of sessions depicted in FIG. 2 are provided by way of example only and should not be construed as limiting.

To monitor the performance of an MCU, or other factors that affect QoE of VOIP session participants, an AMLB (or other such monitoring function) can utilize a QoE "session impact" metric to form a health score for an MCU. A "session impact" can represent, for example, the dynamic load (e.g., the amount of MCU resources required by one or more of the session participants) that a VOIP session places upon an MCU. For example, a particular session can consume a particular fraction (e.g., percentage) of the transmission, or processing, bandwidth of an MCU to receive and transmit data packets between participants of VOIP sessions hosted by that MCU. A session impact metric can be a percentage of the bandwidth capacity of an MCU consumed by a particular session.

An MCU can have resources to host a particular maximum number of sessions, or a maximum number of total participants in VOIP sessions hosted by that MCU. The number of sessions, or total participants in all sessions, hosted by an MCU can be monitored as a fraction, or percentage of the maximum number. In some embodiments, a session impact metric can be a combination (e.g., a formula giving particular QoE weights to particular metrics) of multiple other metrics, such as number of sessions, number of participants in each session, and fraction of MCU bandwidth consumed by each session. AMLB 118 can utilize metrics, such as a session impact metric, to form a health score. For example, AMLB 118 can combine (e.g., according to a weighted formula) the number of total participants in all VOIP sessions hosted by an MCU and the total fraction of MCU resources utilized by those sessions (vs resource remaining available) to form a health score.

FIGS. 3A and 3B illustrate example MCU state tables that incorporate metrics of VOIP sessions hosted on MCUs in the example VOIP system of FIG. 1. A VOIP system can use MCU state tables, such as in the examples of FIGS. 3A and 3B, to monitor the performance state, for example, of an MCU. For purposes of illustrating the examples of 3A and 3B, an AMLB such as illustrated in the example of FIG. 1 can include, maintain (e.g., update), and/or monitor the example MCU tables of FIGS. 3A and 3B.

In the example MCU tables of FIGS. 3A and 3B, the MCU state includes the number of session participants (devices) and the session impact of the session, for each session hosted by the MCUs (110, 112, and 114) of FIG. 1. FIG. 3A illustrates such example MCU state tables for the VOIP sessions illustrated in FIG. 2. MCU state table 210 represents the VOIP sessions hosted by MCU 110 with example session impact values for each session. MCU state tables 220 and 230 represent the VOIP sessions hosted by MCUs 112 and 114, respectively, in FIG. 2. FIG. 3A also illustrates an example health score for each of the MCUs, which can be derived based on the session impacts, number of sessions or total devices (of, for example, a possible maximum), or a combination of these. For example, based on the number of sessions, devices, and/or session impacts MCU 110 as illustrated in FIG. 2 can have a health score of 4.5 of 5 (in which "5" may represent an optimum score). MCUs 112 and 114 can have, similarly, health scores of 4.1 and 4.4, respectively, derived from the MCU state table 220 and 230 metrics.

FIG. 3B illustrates an example of a change in the state of the VOIP sessions, illustrated in FIG. 2, that can affect the MCU health scores, and correspondingly reflect a potential reduction in QoE viewed by participants in one or more of those sessions. For example, 4 of the 7 participants in session 21C can leave the session (such that the number of devices goes from 7 to 3), session 22C can add 3 participants (such that the number of devices goes from 7 to 10), and 4 of the 10 participants in session 23A can leave the session (such that the number of devices goes from 10 to 6).

For each of sessions 21C, 22C, and 23A the changed number of participants (devices) can alter the health score of the corresponding MCU. For example, 4 participants leaving session 21C can leave the session impact to MCU 110 unchanged, but as a factor of there being fewer participants overall using MCU 110, MCU 110 can have an improved health score of 4.6 (vs. 4.5 previously). The increased number of participants in session 22C, and/or the increase in the session impact from 40% to 70%, can reduce the health score of MCU 112, such as to 2 from 4.1 previously. In another example, 4 participants leaving session 23A can leave the session impact to MCU 114 unchanged, but as a factor of there being fewer participants overall using MCU 114, MCU 114 can have an improved health score of 4.7 (vs. 4.5 previously).

An AMLB can monitor an MCU state (e.g., as illustrated in MCU state tables of FIGS. 3A and 3B) and can determine that one or more sessions of an MCU may be experiencing reduced QoE corresponding to a reduced health score. For example, an AMLB can determine that based on a health score of an MCU (e.g., corresponding to conditions illustrated in FIG. 3B), one or more VOIP sessions hosted by MCU 112 can experience lower QoE.

Similarly, an AMLB can determine, based on the health scores of MCUs 110 and 114 improving, that MCUs 110 and 114 can possibly host one or more sessions presently hosted on MCU 112 and that transferring those sessions to MCUs 110 and 114 can improve the QoE of sessions continuing to be hosted on MCU 112. An AMLB can, accordingly recommend transferring particular sessions from MCU 112 to MCUs 110 and/or 114. An AMLB can, further, initiate or participate in performing the transfers.

Figures 4A, 4B:
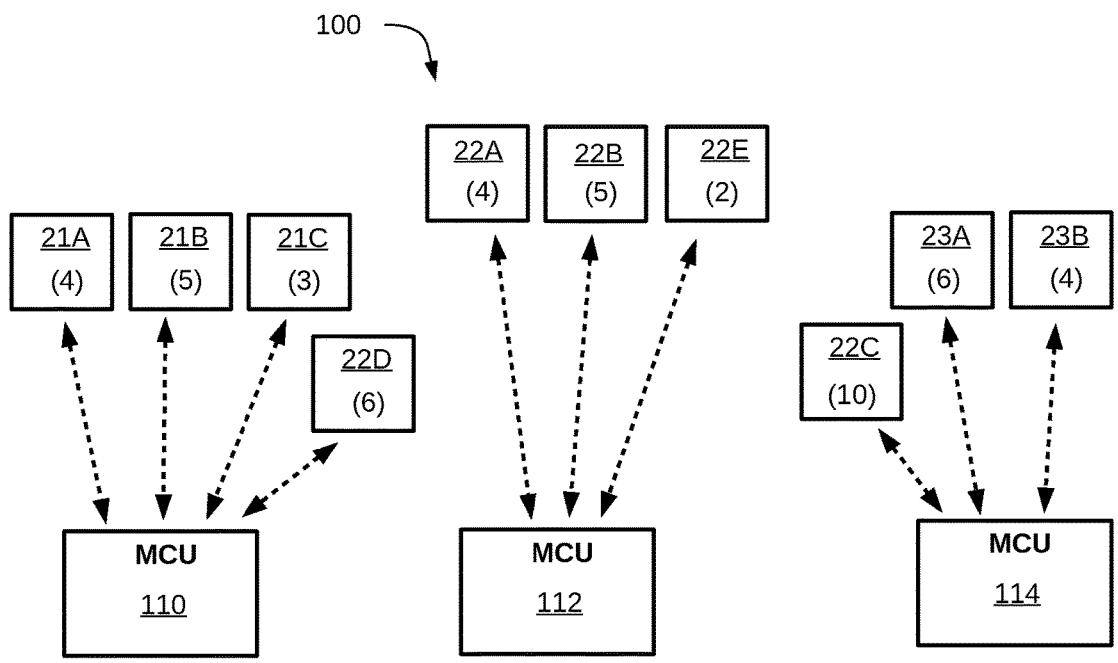
FIG. 4A is a block diagram illustrating an alternative example of MCUs in a VOIP system hosting a plurality of VOIP sessions, according to aspects of the disclosure.
FIG. 4B illustrates an example of health scores for the alternative example of FIG. 4A, according to aspects of the disclosure.

FIG. 4A illustrates an example configuration of the VOIP system of FIGS. 1 and 2 resulting from an AMLB determining, based on the example MCU state table of FIG. 3B, to transfer sessions from MCU 112 to MCUs 110 and 114. FIG. 4B illustrates example MCU state tables that correspond to the example configuration of FIG. 4A. FIG. 4A illustrates the reduced session 22D originally hosted by MCU 112 now hosted by MCU 110. FIG. 4A further illustrates the increased sessions 22C now hosted by MCU 114.

FIG. 4B illustrates that subsequent to the transfer of the sessions, the health score of MCU 110 (in MCU state table 210) is reduced slightly from 4.6 to 4.5, and that of MCU 114 has been reduced from 4.7 to 4.3. The health scores of MCU 110 and 114, while reduced from their values in the changed configuration represented in FIG. 3B, may be still values to support an acceptable QoE for participants in all the sessions hosted by MCUs 110 and 114 as illustrated in FIG. 4A. As a result of transferring the sessions from MCU 112, however, the health score of MCU 112 is now improved to 4 of 5, from 2 of 5, which also may now be a value to support an acceptable QoE for participants in all the sessions hosted by MCU 112.

Health scores, session impacts, QoE of a VOIP session, and performance of a hosting MCU are (non-limiting) examples of a VOIP system metric that can represent aspects of the operation of a particular VOIP session or one or more MCUs. The foregoing examples of FIGS. 2, 3A, 3B, 4A, and 4B illustrate that hosting a VOIP session on an alternate MCU can improve a VOIP system metric, such as the QoE of that VOIP session, or the performance of a first hosting MCU. The examples further illustrate that an alternate MCU can host one or more VOIP sessions transferred from a first hosting MCU without necessarily reducing performance of the alternate MCU, or QoE of VOIP sessions hosted on that alternate MCU.

Figure 5:
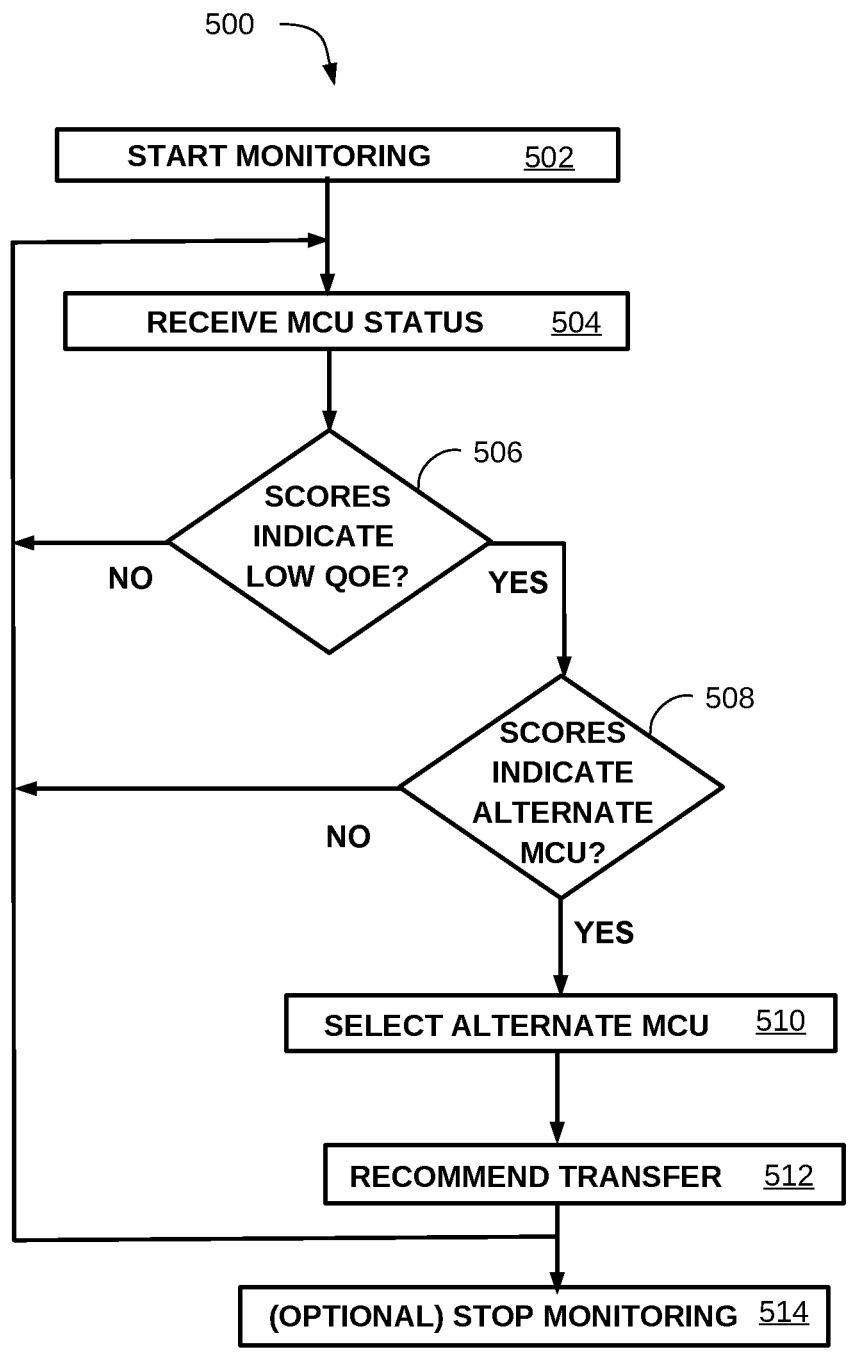
FIG. 5 is a flowchart that illustrates an example method to determine an alternate MCU to host VOIP sessions, according to aspects of the disclosure.

FIG. 5 illustrates an example method to select and recommend an alternate MCU in a VOIP system to host a VOIP session, in response to detecting a potentially reduced QoE (or, lower than desirable health score) of a hosting MCU. For purposes of illustrating the example, the example is described in the context of the example VOIP system of FIG. 1 as performed by an AMLB. However, the example and description of FIG. 5 is not intended to limit embodiments, and it would be apparent to one of ordinary skill in the art that a variety of components, or combination of components, included in or in communication with a VOIP system can perform the method, or operations thereof.

At 502, the AMLB initiates monitoring status of MCUs within the VOIP system. An AMLB can initiate monitoring MCU status by soliciting the MCUs to provide status information. Alternatively, the MCUs can communicate MCU status information without solicitation and, at 502 the AMLB can initiate monitoring in response to receiving status information from one or more MCUs.

At 504, the AMLB receives status information associated with the MCUs. The status information can include a variety of metrics indicating performance or other operational states of the MCUs. The status can include, in particular, health scores, or metrics (e.g., number of sessions, number of participants in each session, and/or session impact) that an AMLB can use to compute a health score for an MCU.

In embodiments, an AMLB can receive status information from an MCU directly, for example, as a message or other signaling means to convey the information from each MCU to the AMLB. An AMLB can receive status information from each MCU individually or, alternatively, from one or a subset of the MCUs that aggregates status of MCUs. In some embodiments, an AMLB can obtain the MCU status from components of a VOIP system, such as a focus, a system management component, another computer included in or in communication with the AMLB, or a memory shared, for example, with the MCUs and the AMLB.

In embodiments, an AMLB can initiate monitoring (502), for example, periodically or in response to an event within the VOIP system (e.g., a participant experiencing low QoE and taking an action to cause monitoring and possible transfer of a VOIP session to another MCU). An AMLB can receive status information (504) in response to initiating monitoring, periodically, or in response to an event within the VOIP system.

In some embodiments, a VOIP system can initiate monitoring in response to initiating a new VOIP session, and can perform the method to determine a recommended MCU to host the newly initiated session. For example, as part of initiating a new VOIP session, a session initiator component of a VOIP system (e.g., a session initiator function of an MCU, a focus, or an AMLB) can select a candidate MCU from among a plurality of possible MCUs to host the new session. The session initiator can invoke a component of the VOIP system (or a combination of components) to perform method 500 to verify that the candidate MCU can host the session with acceptable QoE, or to determine an alternate MCU to host the newly initiated session with improved QoE versus that predicted of the candidate MCU (e.g., based on status information associated with the candidate MCU and alternate MCUs).

At 506 the AMLB processes the MCU status information to determine if a health score or other combination of the metrics (or, particular metrics themselves) in the MCU status indicate that one or more VOIP sessions hosted by an MCU can be experiencing a reduced QoE. For example, an AMLB can utilize an MCU status table such as the example of FIGS. 3A, 3B, and 4B to record MCU status and can utilize contents of an MCU status table or information received at 504—such as number of participants, number of VOIP sessions, and session impact—to formulate a health score. In some embodiments, an AMLB can receive a health score in the status information.

If, at 506, the status information (e.g., a health score included in or computed from the status information) indicates that a session can be experiencing low QoE, the AMLB can evaluate the status (e.g., a health score) of MCUs, at 508, to determine if an alternate MCU can host the session having low QoE and provide a higher QoE, without reducing the QoE of other sessions hosted on that alternate QoE. An AMLB can evaluate the status (e.g., a health score) of MCUs to determine if an alternate MCU can host one or more VOIP sessions hosted on the first MCU to improve the performance of the first MCU (e.g., as indicated by MCU status or a health score) of the first MCU, while, for example, maintaining an acceptable (e.g., above a threshold value) performance (e.g., as indicated by a health score or status) of the alternate MCU. Improving the performance of the first MCU can have a corresponding improvement in the QoE of one or more VOIP sessions the first MCU continues to host.

For example, an AMLB can use metrics such as number of sessions active on the alternate MCU, or the number of participants in a VOIP session, to determine a session impact on the alternate MCU if the VOIP session is transferred from the first MCU to be hosted on the alternate MCU. In another example, an AMLB can use a session impact of a VOIP session on the hosting MCU to predict a session impact of the VOIP session hosted on the alternate MCU, such as by comparing the VOIP session impact on the hosting MCU with the capabilities or capacities of the hosting and alternate MCUs, to derive a predicted session impact on the alternate MCU.

If, at 508, the AMLB determines that an alternate MCU can host the low QoE and/or one or more other VOIP sessions, at 510 the AMLB selects an alternate MCU. An AMLB can identify more than one alternate MCU to host the VOIP session(s) from the first MCU, such as if the health scores of more than one MCU indicate that the VOIP session(s) will have a session impact on the alternate MCUs that maintains an acceptable QoE of the sessions active on the alternates. At 510, the AMLB can apply a variety of criteria to select a best alternate MCU. For example, an AMLB can select an alternate MCU, from among a set of candidate alternates, based on the number of sessions active on the alternate MCUs, or the total number of devices that will be active after transferring the VOIP session(s) from the first MCU to one of the alternate MCUs. An AMLB can, for example, select an MCU from among a set of candidate MCUs that, after transferring the VOIP session(s) to that alternate, has the fewest number of sessions, fewest number of session participants overall, or the least impact to a health score of that MCU.

At 512 the AMLB recommends transferring the VOIP session(s) to the alternate MCU. An AMLB can include an online-recommender component, such as illustrated in the example AMLB of FIG. 1, and the online-recommender can select an alternate MCU and can communicate the recommendation to an MCU switching function of a VOIP system that can determine to transfer the VOIP session(s) from the first MCU, or can perform the transfer. For example, a VOIP system can include a system management or other component (not shown in the example of FIG. 1) which can include an MCU switching function.

An MCU switching function can interface with, or include, a function to receive a recommendation to transfer the VOIP session(s) to the alternate MCU and can automatically perform the transfer. An MCU switching component can include or communicate with a human interface (e.g., a graphical user interface) and, by means of the interface, a human conferencing manager or coordinator can receive the recommendation. Furthermore, the MCU switching component in such embodiments can receive, via the interface, a determination from the conferencing manager or coordinator to transfer the VOIP session to the alternate MCU. An AMLB can include a component capable of receiving the recommendation, and/or performing the transfer, such as the MCU switcher component (128) illustrated in the example AMLB of FIG. 1.

At 514, an AMLB can, optionally, discontinue monitoring. In response to a subsequent event or periodic action, an AMLB can again initiate monitoring (502) and can repeat the method. Alternatively, an AMLB can continue monitoring and at 504 receive updated MCU status and repeat 506 through 512.

The example method 500 illustrates features of the disclosure related to receiving and processing MCU status to determine one or more alternate MCUs to host a VOIP session. The example of FIG. 5 is not intended, however, to limit embodiments. It would be apparent to one of ordinary skill in the art that other operations, other types of status information, other stimuli (besides, for example, reduced QoE or reduced health score) to transfer a VOIP session to an alternate MCU, and other selection criteria can be included in a method to receive and process MCU status and to select a possible alternate MCU to host a VOIP session active on another MCU. It would be further apparent to one of ordinary skill in the art that operations of method 500 can be performed in sequences other than as illustrated, and that operations of the method can, in some embodiments, be performed concurrently.

Figure 6:
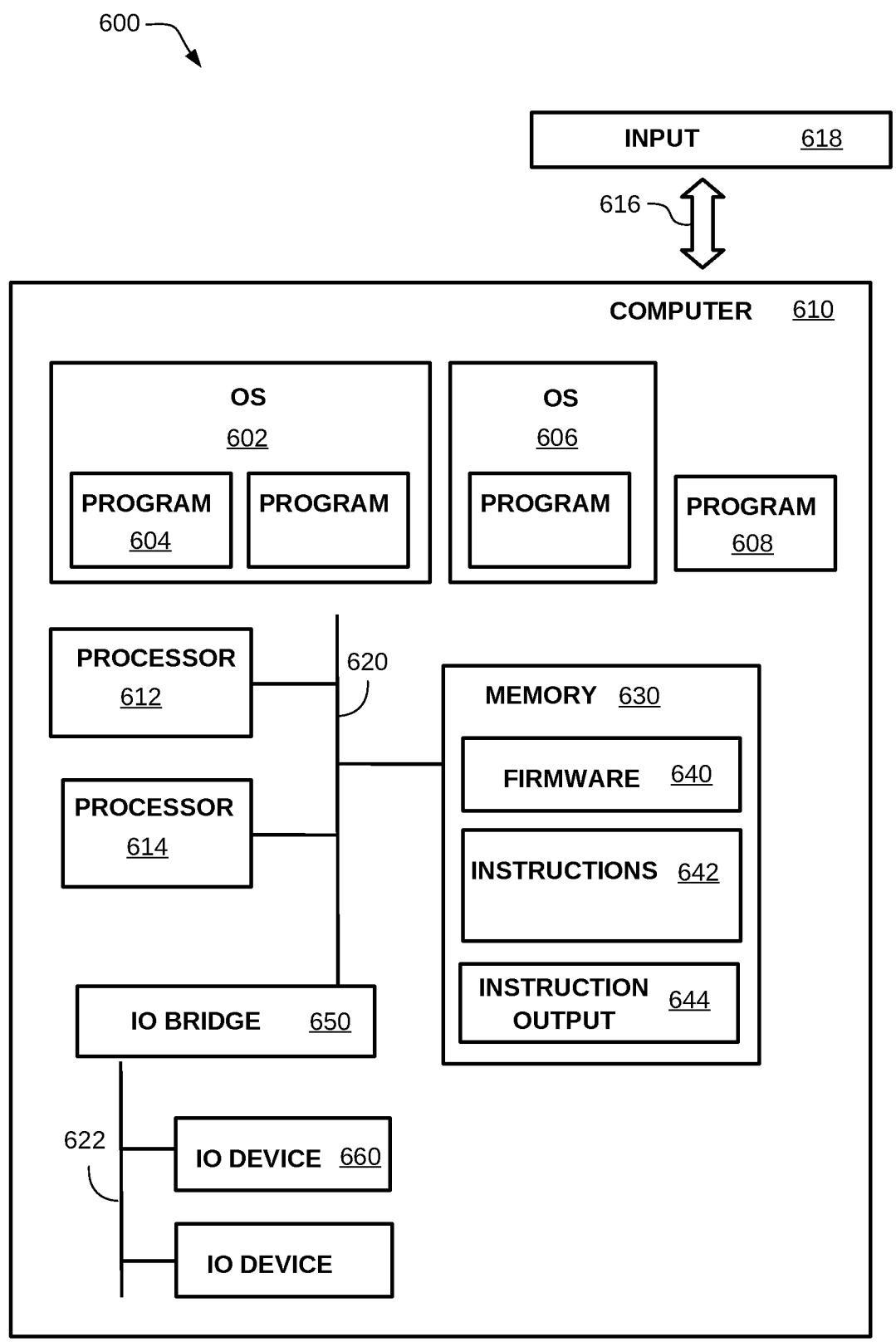
FIG. 6 is a block diagram illustrating a computer system, according to embodiments of the disclosure.

Embodiments of the disclosure can be, or can include a computer system, such as illustrated in the example of FIG. 6. As shown in FIG. 6, computer system 600 includes computer 610 having processors 612 and 614. In embodiments processors can be a single processor or a multi-threaded processor, a general purpose or a special purpose processor, a co-processor, or any of a variety of processing devices that can execute computing instructions.

Computer system 600 is configured with interface 616 coupling computer 610 to input source 618. In embodiments, interface 616 can enable computer 610 to receive, or otherwise access input data via, for example, a network (e.g., an intranet, or a public network such as the Internet), or a storage medium, such as a disk drive internal or connected to computer 610. For example, input source 618 can be an MCU, or a collection of MCUs, such as illustrated in FIG. 1, and input source 618 can provide MCU status information and/or recommendations of an alternate MCU, to computer 610, or otherwise enable computer 610 to receive MCU status information and/or recommendations of alternate MCUs, using interface 616.

Interface 616 can be configured to enable human input, or to couple computer 610 to other input devices, such as described later in regard to components of computer 610. It would be apparent to one of ordinary skill in the art that the interface can be any of a variety of interface types or mechanisms suitable for a computer, or a program operating in a computer, to receive or otherwise access or receive a source netlist.

Processors included in computer 610 are connected by a memory interface 620 to memory 630. In embodiments a memory can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer can include a plurality of memories. A memory interface, such as 620, between a processor (or, processors) and a memory (or, memories) can be, for example, a memory bus common to one or more processors and one or more memories. In some embodiments, a memory interface, such as 620, between a processor and a memory can be point to point connection between the processor and the memory, and each processor in the computer can have a point-to-point connection to each of one or more of the memories. In other embodiments, a processor (for example, 612) can be connected to a memory (e.g., memory 630) by means of a connection (not shown) to another processor (e.g., 614) connected to the memory (e.g., 620 from processor 614 to memory 630).

A computer can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, computer 610 includes IO bridge 650 interfacing memory interface 620 to IO devices, such as IO device 660. In some embodiments, an IO bridge can connect directly to a processor or a memory, or can be a component included in a processor or a memory. An IO bridge can be, for example, a PCI-Express or other IO bus bridge, or can be an IO adapter.

An IO bridge can connect to IO devices by means of an IO interface, or IO bus, such as IO bus 622 of computer 610. For example, IO bus 622 can be a PCI-Express or other IO bus. IO devices can be any of a variety of peripheral IO devices or IO adapters connecting to peripheral IO devices. For example, IO device 660 can be a graphic card, keyboard or other input device, a hard drive or other storage device, a network interface cards, etc. IO device 660 can be an IO adapter, such as a PCI-Express adapter, that connects components (e.g., processors or memories) of a computer to IO devices (e.g., disk drives, Ethernet networks, video displays, keyboards, mice, etc.).

A computer can include instructions executable by one or more of the processors (or, processing elements, such as threads of a processor). The instructions can be a component of one or more programs. The programs, or the instructions, can be stored in, and/or utilize, one or more memories of a computer. As illustrated in the example of FIG. 6, computer 610 includes a plurality of programs, such as program 608 and program 604. A program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes.

A program can be a program that embodies the methods, or portions thereof, of the disclosure. For example, a program can be a program that executes on a processor of computer 610 to perform the example method 500 of FIG. 5, or portions thereof.

Programs can be "stand-alone" programs that execute on processors and use memory within the computer directly, without requiring another program to control their execution or their use of resources of the computer. For example, computer 610 includes stand-alone program 608. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, computer 610 includes operating systems (OSes) 602 and 606, each of which can include, or manage execution of, one or more programs, such as OS 602 including (or, managing) program 604. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 610 includes firmware 640 stored in memory 630. In other embodiments, firmware can be embodied as instructions (e.g., comprising a computer program product) on a storage medium (e.g., a CD ROM, a flash memory, or a disk drive), and the computer can access the instructions from the storage medium.

In embodiments of the present disclosure, Computer 610 can include instructions to perform the example method 500 of FIG. 5, or portions thereof. For example, a program can include instructions 642, which can operate to receive MCU status information and/or recommend an alternate MCU and can store the MCU status (e.g., using an MCU status table such as illustrated in FIG. 3A) or alternate MCU recommendation, in instruction output 644. The computer can store the instructions and/or the instruction output in a memory of the computer, such as computer 610 storing the program instructions 642 and instruction output 644 in memory 630. Hence, instructions 642 can be executed by processor 612 and/or processor 614 to perform one or more of the functions of the AMLB discussed above with respect to FIG. 1. Furthermore, in some embodiments, the instructions 642 can be configured to perform the functions of focus 116, discussed above, in lieu of or in addition to performing one or more functions of the AMLB when the instructions 642 are executed by a processor.

The example computer system 600 and computer 610 are not intended to be limiting. In embodiments, computer system 600 can include a plurality of processors, interfaces, and <inputs> and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computer system embodying aspects and features of the disclosure.

In embodiments, computer 610 can be, for example, a computing device having a processor capable of executing computing instructions and, optionally, a memory in communication with the processor. For example, computer 610 can be a desktop or laptop computer; a tablet computer, mobile computing device, or cellular phone; or, a server computer, a high-performance computer, or a super computer. Computer 610 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computer embodying aspects and features of the disclosure can be any of a variety of computing devices having processors and, optionally, memories and/or programs.

Embodiments in which determining that an alternate MCU hosting the VOIP session can improve one or more VOIP system metrics is based on a health score associated with each of the hosting and alternate MCUs have the advantage of determining that transferring the VOIP session to the alternate MCU does not degrade the alternate MCU performance, or the QoE of sessions hosted on the alternate MCU, below an acceptable level. In other embodiments, in which determining the VOIP metric that can be improved, in transferring the VOIP session to an alternate MCU, is a QoE metric have the advantage of determining that transferring the VOIP session from the first MCU to the alternate MCU can improve the QoE of the VOIP session perceived by the participants.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for transferring, in response to a recommendation, from a first multi control unit (MCU) to a second MCU, hosting of a Voice over IP (VOIP) session, the VOIP session including connecting a plurality of conference devices, the computer program product comprising at least one computer-readable storage medium having program instructions embodied therewith, the program instructions executable by at least one adaptive MCU load balancer (AMLB) processor circuit to cause the at least one computer processor circuit to perform a method comprising:

receiving, with the at least one AMLB processor, first MCU status information from the first MCU, the first MCU included in a plurality of MCUs within a VOIP system, the first MCU hosting the VOIP session, the first MCU status information associated with detected performance degradation of the first MCU;

receiving, with the at least one AMLB processor, second MCU status information from the second MCU, the second MCU included in the plurality of MCUs, the second MCU status information associated with performance of the second MCU;

determining, with the at least one AMLB processor, based at least in part on the first MCU status information and the second MCU status information, that a health score of the second MCU, calculated from the second MCU status information, indicates that hosting the VOIP session with the second MCU provides an improved VOIP Quality of Experience (QoE) metric, in comparison to a QoE metric associated with hosting the VOIP session with the first MCU;

communicating, with the at least one AMLB processor, based at least in part on the determining that the health score of the second MCU indicates that hosting the VOIP session with the second MCU provides an improved VOIP QoE metric, a recommendation, to an MCU switcher component, to transfer the VOIP session from the first MCU to the second MCU; and transferring, with the MCU switcher component, in response to the MCU switcher component receiving the recommendation, the VOIP session from the first MCU to the second MCU, the transfer including connecting the plurality of conference devices to the VOIP session hosted by the second MCU.

2. The computer program product of claim 1, wherein the determining that the second MCU hosting the VOIP session provides an improved VOIP QoE metric comprises:

determining a first health score based, at least in part, on the first MCU status information;

determining a second health score based, at least in part, on the second MCU status information; and determining, based at least in part on comparing the first health score with the second health score, that the second MCU hosting the VOIP session provides an improved VOIP QoE metric.

3. The computer program product of claim 1, wherein the VOIP QoE metric includes a performance metric associated with the first MCU.

4. The computer program product of claim 1, wherein the VOIP QoE metric is measured quantitatively by a Mean Opinion Score (MOS) associated with the VOIP session.

5. The computer program product of claim 4, wherein the QoE metric is associated with a health score calculated from the first MCU status information.

6. The computer program product of claim 1, wherein the receiving the first MCU status information is in response to an event selected from the group consisting of: initiation of the VOIP session, reduction of the VOIP QoE metric, detection of a failure in a component of the VOIP system, and periodic monitoring of MCU status associated with each MCU of the plurality of MCUs.

7. The computer program product of claim 1, wherein each of the first and the second MCU status information includes a number of VOIP sessions that are hosted by the first and the second MCUs, respectively, and, for each VOIP session of the number of hosted VOIP sessions, a number of connected conference devices and a session impact metric.

* * * * *